United States Patent
Ogata et al.

(10) Patent No.: US 11,263,760 B2
(45) Date of Patent: Mar. 1, 2022

(54) INFORMATION PROCESSING APPARATUS, INFORMATION PROCESSING METHOD, AND NON-TRANSITORY COMPUTER-READABLE STORAGE MEDIUM FOR OBTAINING A POSITION/ORIENTATION OF AN OBJECT

(71) Applicant: CANON KABUSHIKI KAISHA, Tokyo (JP)

(72) Inventors: Naoko Ogata, Tokyo (JP); Shinichi Aratani, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/786,155

(22) Filed: Feb. 10, 2020

(65) Prior Publication Data

US 2020/0265589 A1 Aug. 20, 2020

(30) Foreign Application Priority Data

Feb. 15, 2019 (JP) .............................. JP2019-025791

(51) Int. Cl.
- *G06T 7/246* (2017.01)
- *G06T 1/00* (2006.01)
- *G06T 11/00* (2006.01)

(52) U.S. Cl.
CPC ............ *G06T 7/246* (2017.01); *G06T 1/0007* (2013.01); *G06T 11/00* (2013.01); *G06T 2207/30244* (2013.01)

(58) Field of Classification Search
None
See application file for complete search history.

(56) References Cited

U.S. PATENT DOCUMENTS

| | | | | |
|---|---|---|---|---|
| 8,452,451 | B1* | 5/2013 | Francis, Jr. | ............ B25J 9/1658 700/258 |
| 9,696,543 | B2 | 7/2017 | Aratani | |
| 2008/0240550 | A1* | 10/2008 | Morita | ..................... G06T 7/70 382/154 |
| 2016/0337548 | A1* | 11/2016 | Osborn | .............. H04N 1/00251 |
| 2017/0069138 | A1 | 3/2017 | Aratani | |
| 2017/0148167 | A1 | 5/2017 | Aratani | |
| 2018/0005435 | A1* | 1/2018 | Anderson | ............... G06F 3/011 |

FOREIGN PATENT DOCUMENTS

JP 2014203382 A 10/2014

OTHER PUBLICATIONS

Siltanen, Sanni. "Theory and applications of marker-based augmented reality: Licentiate thesis." (2012).*
G. Baratoff, A. Neubeck and H. Regenbrecht, "Interactive Multi-Marker Calibration for Augmented Reality Applications," Proc. ISM AR 2002, Sep. 2002, pp. 1-11.

* cited by examiner

*Primary Examiner* — Frank S Chen
(74) *Attorney, Agent, or Firm* — Carter, DeLuca & Farrell LLP

(57) ABSTRACT

An information processing apparatus comprises a first acquisition unit configured to acquire information concerning an index based on a captured image including a physical object added with the index, a second acquisition unit configured to acquire a thumbnail image of the physical object, and a holding unit configured to hold, in a memory, physical object information including the information and the thumbnail image of the physical object added with the index.

11 Claims, 11 Drawing Sheets

| INDEX | DISPLAY POSITION INFORMATION | VIRTUAL OBJECT |
|---|---|---|
| 1 | | OBJECT 1 |
| 2 | | OBJECT 1 |
| 3 | | OBJECT 2 |
| 4 | | OBJECT 2 |

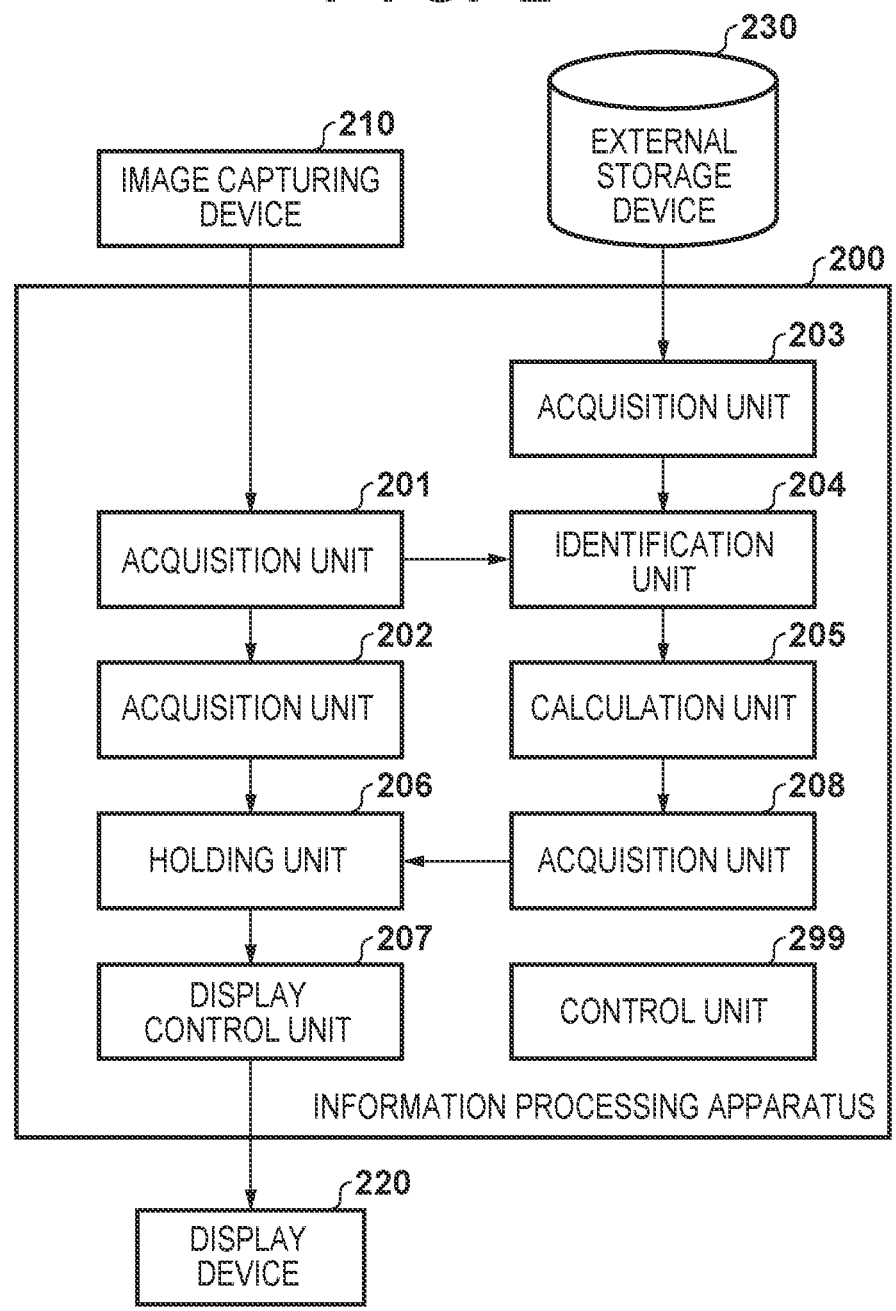

FIG. 4A
| ID | THUMBNAIL | TRACKING OBJECT NAME | TRACKING |
|---|---|---|---|
| 1 | 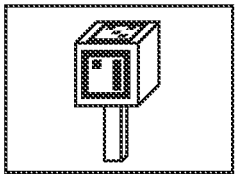 | AAA | ☑ |
| 2 |  | BBB | ☐ |
| 3 | 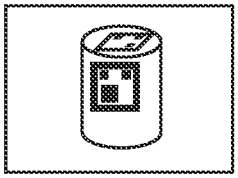 | CCC | ☑ |
FIG. 4B
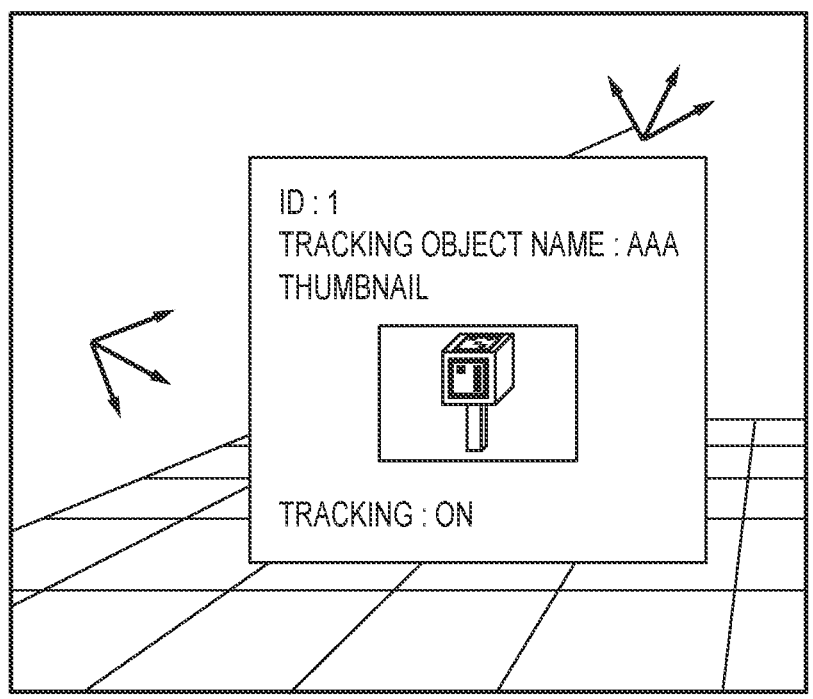
ID : 1
TRACKING OBJECT NAME : AAA
THUMBNAIL
TRACKING : ON

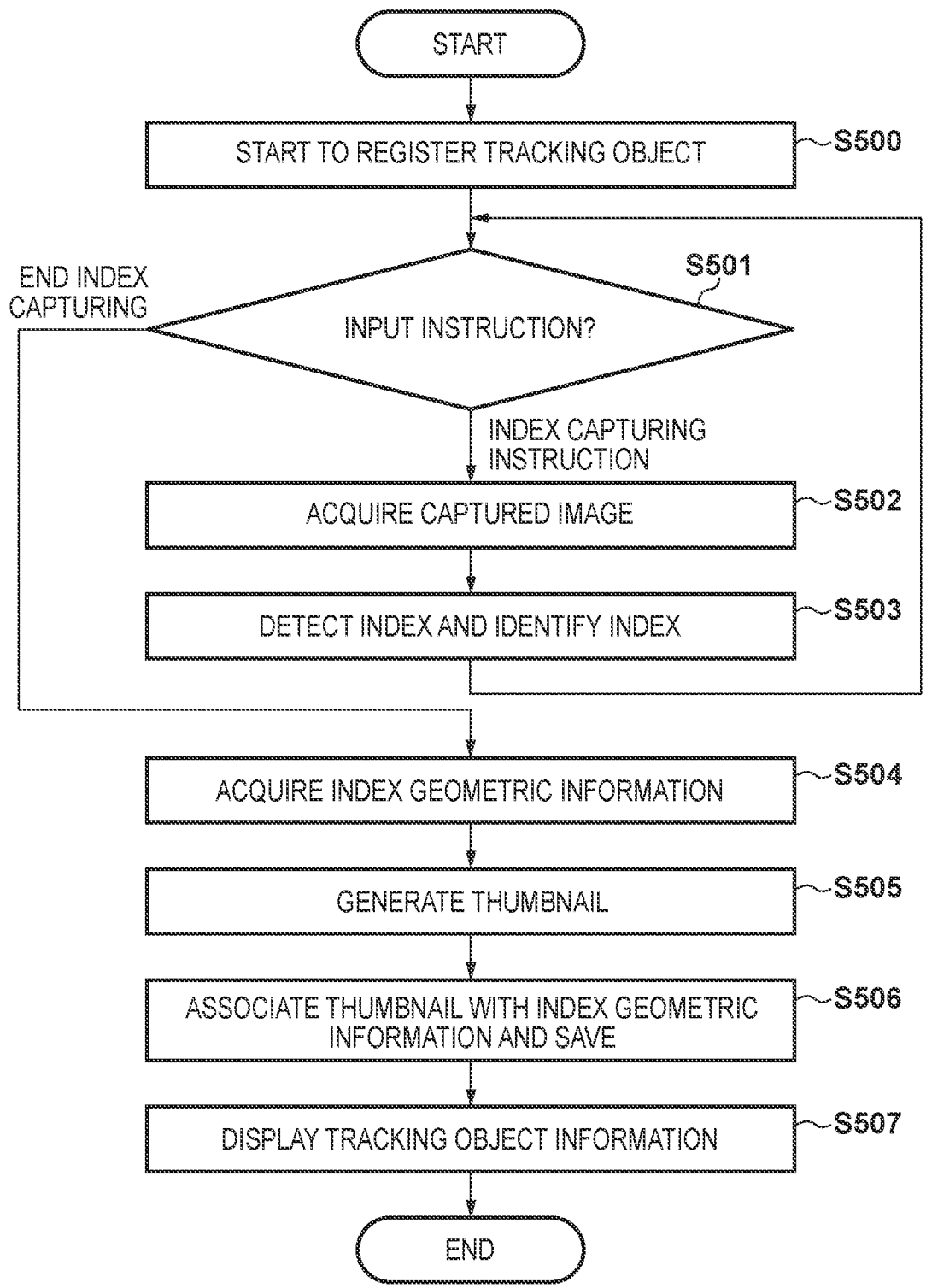

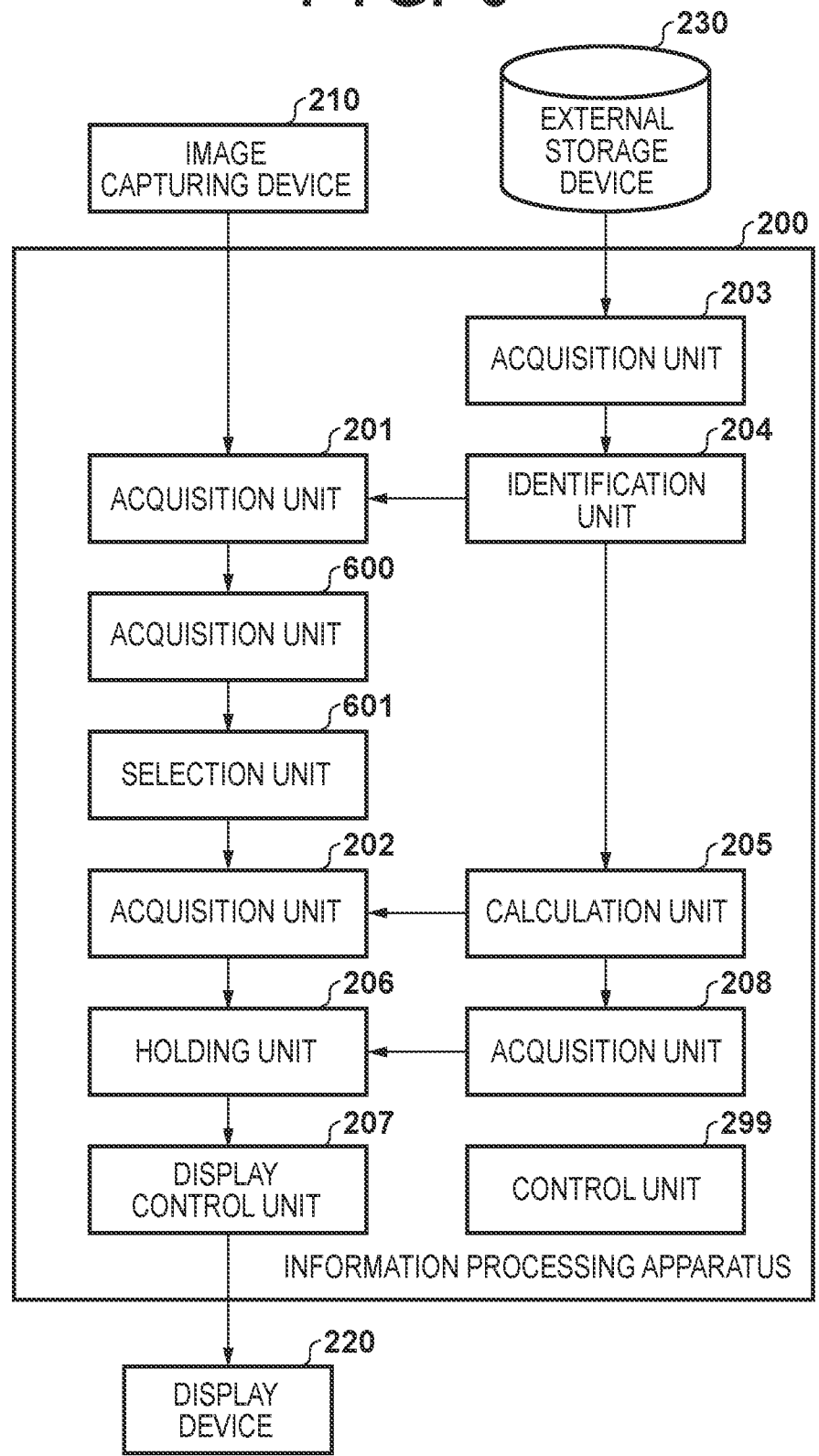

INFORMATION PROCESSING APPARATUS, INFORMATION PROCESSING METHOD, AND NON-TRANSITORY COMPUTER-READABLE STORAGE MEDIUM FOR OBTAINING A POSITION/ORIENTATION OF AN OBJECT

BACKGROUND OF THE INVENTION

Field of the Invention

The present invention relates to a technique for obtaining the position/orientation of an object.

Description of the Related Art

An MR (Mixed Reality) technique or an AR (Augmented Reality) technique is known as a technique of fusing a physical world and a virtual world in real time. These techniques are techniques of seamlessly fusing a physical space and a virtual space created by a computer, and are expected to be applied to various fields such as assembly support in which an operation procedure is displayed in a superimposed manner at the time of an assembly operation and surgery support in which a state inside a body is displayed in a superimposed manner on the body surface of a patient.

As an example of an evaluation item using these systems, it is evaluated whether an operation can be performed without making a tool interfere with objects other than a target part. A system that performs such evaluation is sometimes required to have a function of allowing a person who experiences the system to grasp and move a virtual object (for example, a tool). As a method of implementing this, a real object that a person can grasp and move is prepared, and a virtual object is displayed on the real object in a superimposed manner, thereby making the person who experiences the system have a feeling of grasping and moving the virtual object.

To display the virtual object in a superimposed manner in accordance with the motion of the real object, first, geometrical matching needs to be ensured between the virtual space and the physical space. Furthermore, it is necessary to decide the position/orientation of the virtual object by obtaining the position/orientation of the real object in the physical space.

As a method of implementing this, a video see-through type information processing apparatus is used. This is an apparatus that captures the physical world by a video camera, and displays a composite image obtained by superimposing a virtual object on the captured image on a display unit such as a display in real time, thereby presenting the image to an observer. As such an information processing apparatus, generally, a portable information terminal called a tablet terminal with a video camera provided on the rear surface or head mounted a video see-through type HMD (Head Mounted Display) is used.

In the MR using the video see-through type HMD, every time an image is input from a camera incorporated in the HMD, the position/orientation of the camera in the physical space upon image capturing is measured, and a virtual space is constructed based on the position/orientation, thereby ensuring the geometrical matching between the physical space and the virtual space. Furthermore, when the relative position/orientation between the obtained position/orientation of the camera and that of the real object is analyzed, the position/orientation of the real object in the physical space can be obtained. This can be implemented by preparing a real object to which one or more indices that enable analysis of the relative position/orientation to the camera are added, acquiring an image including the indices by the camera, and calculating the image coordinate values of the indices. The indices are indices each capable of uniquely specifying a region in an image by image processing by the information processing apparatus and obtaining coordinates in a three-dimensional space. A target to measure the position/orientation in the physical space, like the above-described camera and the real object on which the virtual object is superimposed, will be referred to as a tracking object hereinafter.

In Japanese Patent Laid-Open No. 2014-203382, a technique for appropriately displaying a virtual object using a plurality of indices is described. In the technique described in Japanese Patent Laid-Open No. 2014-203382, for each index, a virtual object whose position/orientation is to be decided using the index and a relative position/orientation to display the virtual object for the index position are stored in advance as display information, and the virtual object is displayed based on the information.

If a plurality of tracking objects exist in the physical space, the person who experiences the system needs to recognize which tracking object is a tracking object associated with the virtual object.

In the technique described in Japanese Patent Laid-Open No. 2014-203382, as described above, for each index, a virtual object whose position/orientation is to be decided using the index and a relative position/orientation to display the virtual object for the index position are stored in advance as display information, and the virtual object is displayed based on the information. Assume that a plurality of tracking objects 100 to 102 exist in the physical space, as shown in FIG. 1A, and pieces of display information used to display virtual objects are displayed, as shown in FIG. 1B, according to Japanese Patent Laid-Open No. 2014-203382. The display information shown in FIG. 1B is displayed for each index. Indices 110 to 115 are added with features that can uniquely be identified by the information processing apparatus, and therefore, are not suitable as information used by the person who experiences the system to recognize a tracking object. That is, it is difficult for the person who experiences the system to determine which one of the tracking objects 100 to 102 is the tracking object on which a virtual object is to be displayed in a superimposed manner.

SUMMARY OF THE INVENTION

The present invention provides a technique for allowing a user to recognize a physical object on which a virtual object is to be displayed in a superimposed manner among physical objects existing in a physical space.

According to the first aspect of the present invention, there is provided an information processing apparatus comprising: a first acquisition unit configured to acquire information concerning an index based on a captured image including a physical object added with the index; a second acquisition unit configured to acquire a thumbnail image of the physical object; and a holding unit configured to hold, in a memory, physical object information including the information and the thumbnail image of the physical object added with the index.

According to the second aspect of the present invention, there is provided an information processing apparatus comprising: a first acquisition unit configured to acquire an identifier of a sensor attached to a physical object to measure a position/orientation of the physical object; a second acquisition unit configured to acquire a thumbnail image of the physical object; and a holding unit configured to hold, in a memory, physical object information including the identifier of the sensor and the thumbnail image of the physical object.

According to the third aspect of the present invention, there is provided an information processing method comprising: acquiring information concerning an index based on a captured image including a physical object added with the index; acquiring a thumbnail image of the physical object; and holding, in a memory, physical object information including the information and the thumbnail image of the physical object added with the index.

According to the fourth aspect of the present invention, there is provided a non-transitory computer-readable storage medium storing a computer program configured to cause a computer to function as: a first acquisition unit configured to acquire information concerning an index based on a captured image including a physical object added with the index; a second acquisition unit configured to acquire a thumbnail image of the physical object; and a holding unit configured to hold, in a memory, physical object information including the information and the thumbnail image of the physical object added with the index.

According to the fifth aspect of the present invention, there is provided a non-transitory computer-readable storage medium storing a computer program configured to cause a computer to function as: a first acquisition unit configured to acquire an identifier of a sensor attached to a physical object to measure a position/orientation of the physical object; a second acquisition unit configured to acquire a thumbnail image of the physical object; and a holding unit configured to hold, in a memory, physical object information including the identifier of the sensor and the thumbnail image of the physical object.

Further features of the present invention will become apparent from the following description of exemplary embodiments (with reference to the attached drawings).

BRIEF DESCRIPTION OF THE DRAWINGS

FIG. 2 is a block diagram showing an example of the functional arrangement of a system;

FIGS. 4A and 4B are views showing an example of display control by a display control unit 207;

FIG. 5 is a flowchart showing the operation of the information processing apparatus 200;

FIG. 6 is a block diagram showing an example of the functional arrangement of a system;

DESCRIPTION OF THE EMBODIMENTS

Figures 1A, 1B:
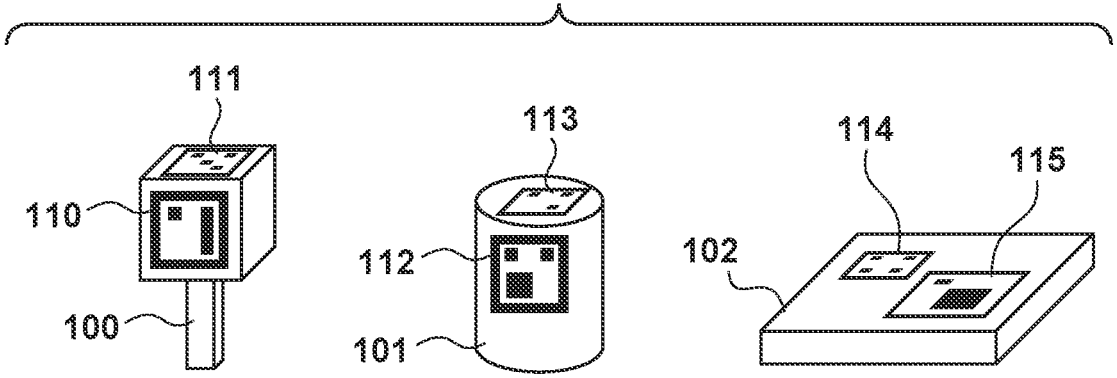
FIGS. 1A and 1B are views for explaining the problem of a conventional technique.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

An example of the functional arrangement of a system according to this embodiment will be described first with reference to the block diagram of FIG. 2. As shown in FIG. 2, the system according to this embodiment includes an image capturing device 210, an external storage device 230, an information processing apparatus 200, and a display device 220.

In this embodiment, assume that one or more tracking objects (for example, tracking objects 100, 101, and 102 as shown in FIG. 1A) each added with a plurality of indices are arranged in the physical space, and one or more of them are located in the image capturing range of the image capturing device 210. A tracking object is a physical object added with a plurality of indices, and its shape and material are not limited to specific forms. In addition, the position/orientation of an index added to a tracking object on a tracking object coordinate system (for example, a coordinate system in which the origin is set at one point on the tracking object, and three axes that are orthogonal to each other at the origin are defined as x-, y-, and z-axes) is known.

First, the image capturing device 210 will be described. The image capturing device 210 may be an image capturing device that captures a moving image of the physical space, or may be an image capturing device that captures a still image periodically or irregularly. The image capturing device outputs a captured image (if a moving image is captured, the image of each frame, or if a still image is captured, the still image) as a captured image. The image capturing device 210 may be a single device, or may be a device attached (mounted) on an HMD or the like. Alternatively, the image capturing device 210 may be a camera configured to perform motion capture specialized to tracking.

The information processing apparatus 200 will be described next. An acquisition unit 201 acquires a captured image output from the image capturing device 210 and the position/orientation of the image capturing device 210 when capturing the image.

The method of acquiring the position/orientation of the image capturing device 210 when capturing the image is not limited to a specific acquisition method. For example, assume that a captured image of the physical space in which an index (different from an index added to a tracking object) whose position/orientation (arrangement position/orientation) is known is arranged is output from the image capturing device 210. In this case, the acquisition unit 201 obtains the position/orientation of the image capturing device 210 using the image coordinates of the index in the captured image and the arrangement position/orientation of the index. This technique is a known technique, and a description of the technique will be omitted. In addition, for example, if a position/orientation sensor is attached to the image capturing device 210, the acquisition unit 201 obtains the position/orientation of the image capturing device 210 based on a measurement value output from the position/orientation sensor.

An acquisition unit 203 acquires index information that is "information concerning an index added to a tracking object" and is stored in the external storage device 230. Index information exists for each index added to the tracking object. Indices include, for example, a rectangular index that internally includes a pattern representing its identifier and can uniquely be identified, a region specified based on the brightness gradient of images at a plurality of viewpoints, and a plurality of points (point coordinates) whose three-dimensional positions are known. The index information of an index of interest includes, for example, an identifier unique to the index of interest, the shape of the index of interest, the size of the index of interest, the features (features according to the type of the index of interest, such as a pattern and a brightness) of the index of interest, an identifier unique to the tracking object to which the index of interest is added, and the like. In addition, the index information of the index of interest includes the position/orientation of the index of interest on the tracking object coordinate system.

An identification unit 204 identifies each index included in the captured image acquired by the acquisition unit 201. In the identifying of the index, specifying processing of specifying the image coordinates of each index in the captured image and specifying processing of specifying index information corresponding to each index included in the captured image in the pieces of index information of the indices stored in the external storage device 230 are performed. In the latter specifying processing, for example, if the above-described rectangular index is used as the index, the identifier of the index is specified by recognizing the pattern of the index in the captured image, and index information including the identifier is specified as the index information of the index.

An acquisition unit 202 acquires the thumbnail image of the tracking object. The method of acquiring the thumbnail image of the tracking object is not limited to a specific method. For example, the image of the tracking object stored in the external storage device 230 in advance in association with the identifier of the tracking object included in the index information of the index in the captured image specified by the identification unit 204 may be acquired as the thumbnail image of the tracking object. Alternatively, for example, an image in a region including the index of the index information including the identifier of the same tracking object in the captured image may be acquired as the thumbnail image of the tracking object. At any rate, in this embodiment, the thumbnail image of the tracking object is the actually captured image of the tracking object, and an identifier unique to the e tracking object is associated with the thumbnail image. The acquisition unit 202 registers the acquired thumbnail image in a holding unit 206.

A calculation unit 205 obtains the index geometric information of each index in the captured image using the position/orientation of the image capturing device 210 acquired by the acquisition unit 201 and the image coordinates of the index obtained by the identification unit 204.

For example, for each group of indices of index information including the identifier of the same tracking object (for each tracking object), the index geometric information of the index belonging to the group is obtained using the position/orientation of the image capturing device 210 and the image coordinates of the index belonging to the group.

In this embodiment, for a reference index (an arbitrary one of indices added to a tracking object of interest) in the indices added to the tracking object of interest, the position/orientation of the reference index is obtained as the index geometric information of the reference index. Additionally, in this embodiment, for a non-reference index other than the reference index in the indices added to the tracking object of interest, a relative position/orientation to the position/orientation of the reference index is obtained as the index geometric information of the non-reference index.

Here, to calculate the relative position/orientation between indices, the position and orientation of each index on a reference coordinate system (for example, a coordinate system in which the origin is set at one point on the physical space, and three axes that are orthogonal to each other at the origin are defined as x-, y-, and z-axes) need to be measured. This measurement can be done by a manual operation using a measuring tape or a protractor or by a survey instrument. From the viewpoint of accuracy and labor, measurement using an image is performed. To measure the position of a point index, a method called bundle adjustment can be applied. The bundle adjustment is a method of capturing a lot of images of a point index by an image capturing device and obtaining the position and orientation of the image capturing device that has captured the images and the position of the point index. They are obtained by performing a repetitive operation such that the error (projection error) between a projection position where the index is actually observed on an image and a projection position calculated from the position and orientation of the image capturing device and the position of the index is minimized. At this time, a constraint condition that three points, that is, the position of the point index in the physical space, the projection point of the point index on the image, and the viewpoint of the image capturing device exist on the same line is used. In addition, a method of measuring the positions and orientations of a number of rectangular indices arranged in a three-dimensional space is disclosed in G. Baratoff, A. Neubeck and H. Regenbrecht, "Interactive multi-marker calibration for augmented reality applications", Proc. ISM AR2002, 2002. A number of images of a number of rectangular indices arranged in the three-dimensional space are captured, and the position and orientation of the image capturing device 210 that has captured each image and the position and orientation of each rectangular index are obtained by a repetitive operation such that the projection error is minimized.

Note that the index geometric information of the non-reference index is not limited to the relative position/orientation to the position/orientation of the reference index. For example, the index geometric information of the non-reference index may be the relative position to the position of the reference index, or may be the relative orientation to the orientation of the reference index.

An acquisition unit 208 registers the index geometric information of the index obtained by the calculation unit 205 in the holding unit 206 in association with the thumbnail image associated with the identifier included in the index information of the index in the thumbnail images registered in the holding unit 206 by the acquisition unit 202. With this associating, the index geometric information of the index added to the same tracking object is associated with the thumbnail image of the tracking object. A set of index geometric information and a thumbnail image registered in the holding unit 206 for one tracking object will be referred to as tracking object information (physical object information) hereinafter.

Note that the pieces of information included in the tracking object information are not limited to the index geometric information and the thumbnail image. For example, a name used to identify the tracking object, information (flag information) representing whether to perform tracking or not, and the registration date/time of the tracking object and the updating date/time of the information may be included in the tracking object information. In addition, the information of a virtual object to be superimposed on the tracking object may be included in the tracking object information. In this embodiment, flag information represents whether a corresponding tracking object is the tracking target or not (whether a tracking object is a target to measure the position/orientation, on which a virtual object is to be superimposed), and is included in tracking object information for each tracking object.

A display control unit 207 displays some or all pieces of information, which are included in the tracking object information registered in the holding unit 206, on the display device 220 in association with each other. The display form of the tracking object information is not limited to a specific display form. For example, as shown in FIG. 4A, the identifier (ID) of each tracking object included in the tracking object information, the thumbnail image, the name of the tracking object (tracking object name), and flag information (tracking) representing whether to perform tracking or not may be displayed. Alternatively, as shown in FIG. 4B, the identifier (ID=1) of a tracking object, the thumbnail image, the tracking object name, and flag information (ON) representing whether to perform tracking or not may be displayed on a view on which the three-dimensional position/orientation of the tracking object can be confirmed from a broad perspective. Not all pieces of information included in the tracking object information need to be displayed, and the user may be able to select the display target by operating an operation unit. A control unit 299 controls the operation of each functional unit provided in the information processing apparatus 200.

Figure 3:
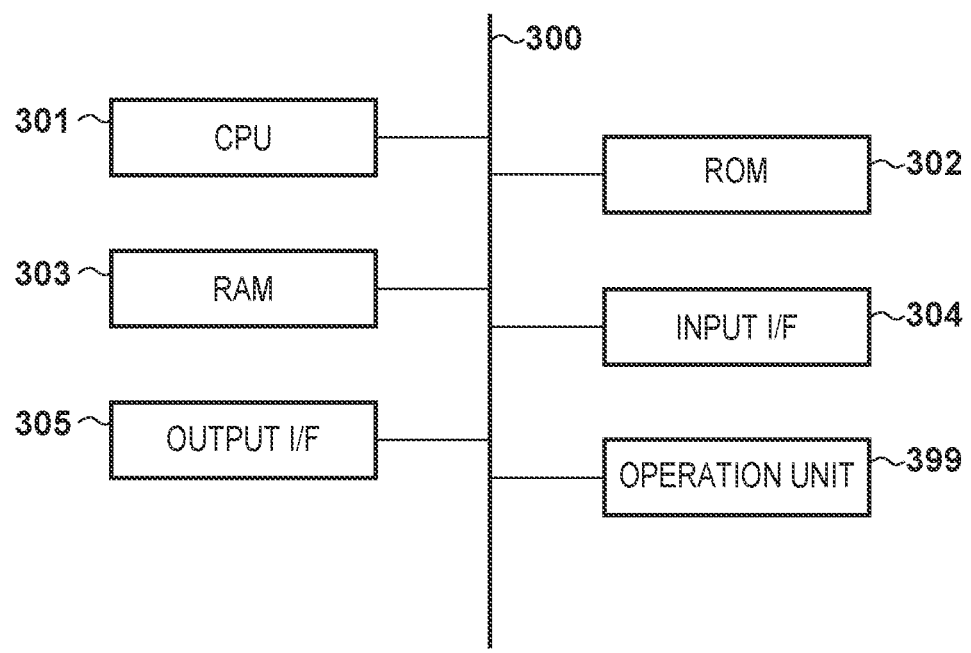
FIG. 3 is a block diagram showing an example of the hardware arrangement of an information processing apparatus 200.

The display device 220 will be described next. The display device 220 includes a liquid crystal screen or a touch panel screen, and can display a processing result of the information processing apparatus 200 using an image or characters. If the display device 220 includes a touch panel screen, the display device 220 can accept an operation input from the user. In addition, the display device 220 may be integrated with the above-described image capturing device 210 to form an HMD An example of the hardware arrangement of the information processing apparatus 200 will be described next with reference to the block diagram of FIG. 3. Note that the arrangement shown in FIG. 3 is merely an example of a hardware arrangement applicable to the information processing apparatus 200, and changes/modifications can be made as needed.

Figure 10:
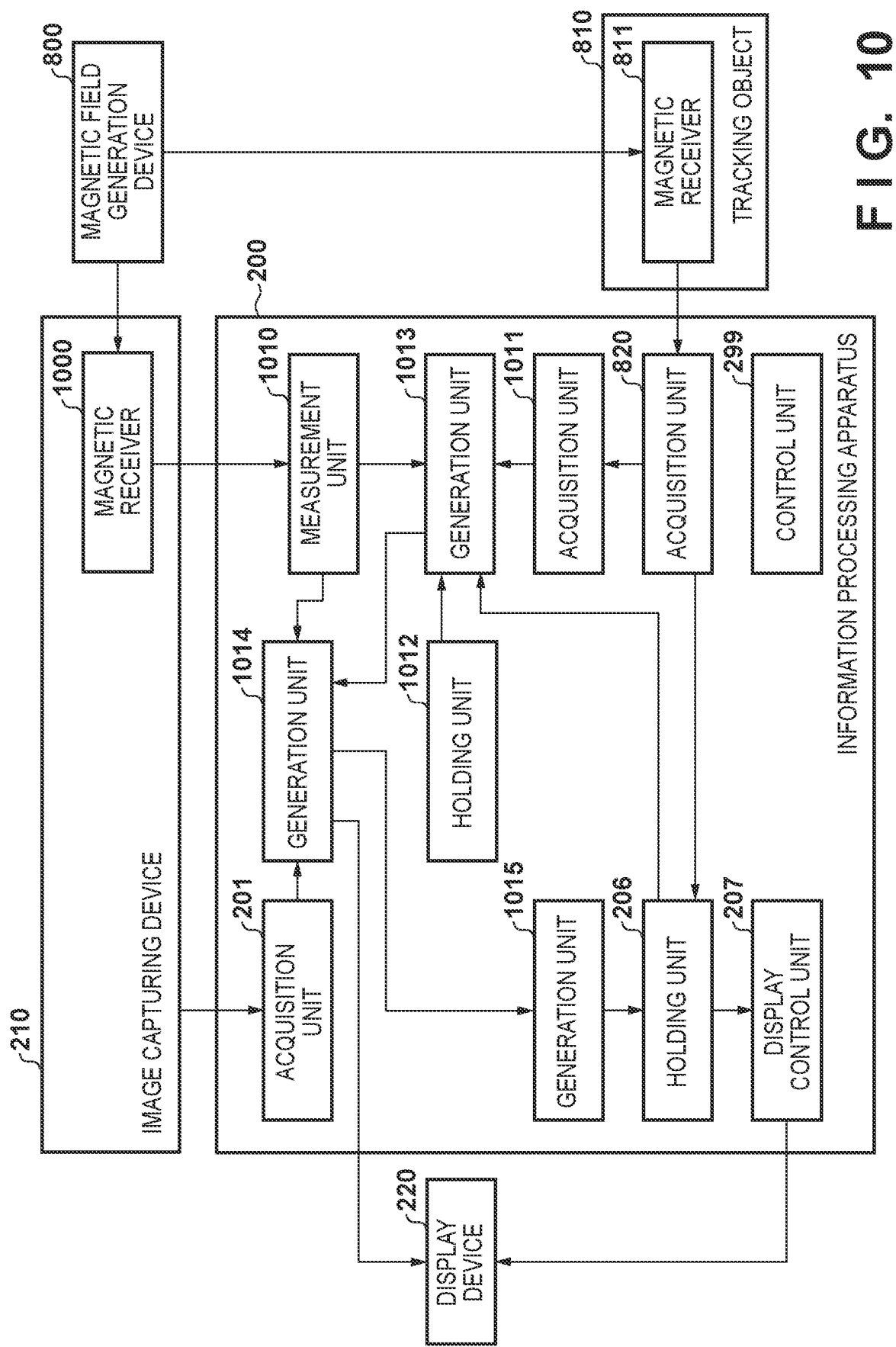
FIG. 10 is a block diagram showing an example of the functional arrangement of a system.

A CPU 301 executes various kinds of processing using computer programs and data stored in a RAM 303 and a ROM 302. The CPU 301 thus controls the operation of the entire information processing apparatus 200, and also executes or controls each processing to be explained as processing to be performed by the information processing apparatus 200. The functional units (except the holding unit 206) of the information processing apparatus 200 shown in FIG. 2 will be described below as the main constituent of processing. In fact, the CPU 301 executes a computer program configured to cause the CPU 301 to execute the functions of the functional units, thereby implementing the functions of the functional units. This also applies to the functional units other than the holding unit in FIGS. 6, 8, and 10.

The ROM 302 stores the setting data, the activation program, and the like of the information processing apparatus 200. The RAM 303 includes an area used to store a computer program or data loaded from the external storage device 230 or the ROM 302, and an area used to store a captured image acquired from the image capturing device 210 via an input I/F 304. Furthermore, the RAM 303 includes a work area used by the CPU 301 to execute various kinds of processing. As described above, the RAM 303 can provide various kinds of areas as needed.

The input I/F 304 is used to connect the image capturing device 210, and a captured image output from the image capturing device 210 is saved in the RAM 303 or the external storage device 230 via the input I/F 304. The external storage device 230 is connected to a bus 300.

An output I/F 305 is used to connect the display device 220, and information (for example, a GUI (graphical user interface) shown in FIG. 4A or 4B) output from the information processing apparatus 200 is output to the display device 220 via the output I/F 305.

An operation unit 399 is a user interface such as a keyboard, a mouse, or a touch panel screen. The user can input various kinds of instructions to the CPU 301 by operating the operation unit 399. Note that the holding unit 206 shown in FIG. 2 is implemented by a memory device such as the RAM 303 or the external storage device 230.

The operation of the information processing apparatus 200 will be described with reference to the flowchart of FIG. 5. In step S500, the control unit 299 acquires information concerning a tracking object such as the identifier and the name of the tracking object. For example, information concerning the tracking object, which is input by a user operation on the operation unit 399 or the touch panel screen provided in the display device 220, is acquired.

In step S501, the control unit 299 accepts a start instruction of image capturing by the image capturing device 210. When the user inputs the start instruction of image capturing by operating the operation unit 399, and the control unit 299 detects the start instruction, the process advances to step S502. On the other hand, when the user inputs an end instruction of image capturing (index geometric information generation start instruction) by operating the operation unit 399, and the control unit 299 detects the end instruction, the process advances to step S504.

In step S502, the acquisition unit 201 acquires the captured image output from the image capturing device 210 and the position/orientation of the image capturing device 210 when capturing the image. In step S503, the acquisition unit 203 acquires index information saved in the external storage device 230. The identification unit 204 identifies each index included in the captured image acquired by the acquisition unit 201 in step S502, thereby specifying the image coordinates of each index in the captured image and index information corresponding to the index. The process returns to step S501. The processing of steps S501 to S503 is repeated, thereby acquiring, for each captured image, a set of the position/orientation of the image capturing device 210 when capturing the image, the image coordinates of each index in the captured image, and the index information of each index in the captured image.

On the other hand, in step S504, the calculation unit 205 obtains the index geometric information of each index in the captured image using the above-described set. In step S505, the acquisition unit 202 acquires the thumbnail image of the tracking object. The acquisition unit 202 registers the acquired thumbnail image in the holding unit 206.

In step S506, the acquisition unit 208 registers the index geometric information of the index obtained by the calculation unit 205 in the holding unit 206 in association with the thumbnail image associated with the identifier included in the index information of the index. Note that the index geometric information of the index may include the index information of the index.

In step S507, the display control unit 207 displays, on the display device 220, the tracking object information registered in the holding unit 206 by the acquisition unit 208 in step S506.

As described above, according to this embodiment, as the information to be used by the user to recognize a tracking object, the image of the tracking object added with an index can be displayed together with the information concerning the tracking object. This allows the user to recognize which one of a plurality of tracking objects existing in the physical space is a tracking object associated with the virtual space.

Note that in this embodiment, the thumbnail image of the tracking object is registered in the processing according to the flowchart of FIG. 5. However, the timing of registering the thumbnail image of the tracking object is not limited to the timing shown in the flowchart of FIG. 5. For example, editing/updating may be performed after registration, or the thumbnail image may be registered in association with the index geometric information after registration of the index geometric information.

<Modification 1>

In the first embodiment, a captured image or an actually captured image captured in advance is used as the thumbnail image of the tracking object. However, the image usable as the thumbnail image of the tracking object is not limited to these.

For example, an image generated by processing the thumbnail image acquired in the first embodiment such that the tracking object can easily be confirmed may be used as a thumbnail image anew. The thumbnail image processing method is not limited to a specific processing method. A minimum rectangle including a region where the tracking object is captured may be used, or the background region other than the tracking object may be painted in a single color. In this case, the acquisition unit 202 detects the region of the tracking object in the captured image, and the thumbnail image processed by a user operation or processing by the acquisition unit 202 is registered in the holding unit 206.

As described above, when the thumbnail image is processed such that the tracking object can easily be confirmed, the tracking object can be recognized even if an object other than the tracking object is captured in the image.

<Modification 2>

In the first embodiment, an example in which the image capturing device that has captured the image as the target to identify an index and the image capturing device that has captured the image as the thumbnail image generation source are identical has been described. However, the present invention is not limited to this. The image capturing devices that have captured the images need not always be identical as long as the captured image that enables identification of an index and the captured image capable of generating a thumbnail image can be acquired.

In this case, another image capturing device different from the image capturing device 210 is connected to the information processing apparatus 200. The acquisition unit 202 generates the thumbnail image of a tracking object based on not the captured image from the image capturing device 210 but a captured image from the other image capturing device different from the image capturing device 210.

As described above, even if the image capturing device that has captured the image to identify an index is not suitable as the image capturing device that captures the image to detect the tracking object, a thumbnail image that allows the user to confirm the tracking object can be generated.

Second Embodiment

In the following embodiments including this embodiment, differences from the first embodiment will be described, and the rest is assumed to be the same as in the first embodiment unless it is specifically stated otherwise. In this embodiment, a plurality of candidates for the thumbnail image of a tracking object are collected, and one of them is selected.

An example of the functional arrangement of a system according to this embodiment will be described with reference to the block diagram of FIG. 6. An acquisition unit 600 acquires, as a thumbnail candidate image, a captured image including a tracking object in captured images acquired by an acquisition unit 201. A selection unit 601 selects an image to be used as a thumbnail image from the thumbnail candidate images acquired by the acquisition unit 600, and inputs the selected thumbnail candidate image to an acquisition unit 202.

Figure 7:
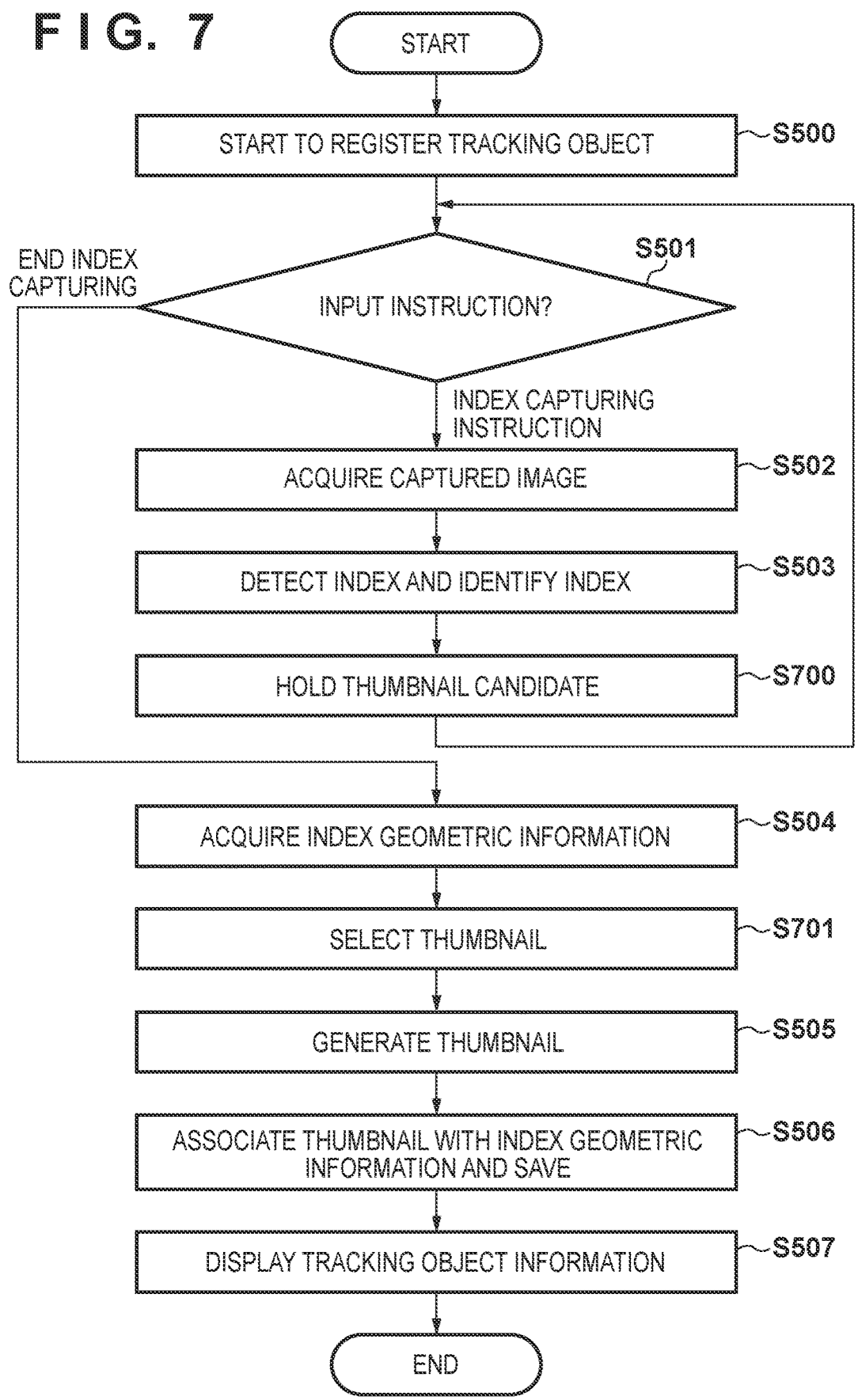
FIG. 7 is a flowchart showing the operation of an information processing apparatus 200.

The operation of an information processing apparatus 200 according to this embodiment will be described with reference to the flowchart of FIG. 7. In step S700, the acquisition unit 600 acquires, as a thumbnail candidate image, a captured image including a tracking object in captured images acquired by the acquisition unit 201, that is, a captured image used by an identification unit 204 to identify an index.

Note that the thumbnail candidate image is not limited to the captured image used by the identification unit 204 to identify the index. For example, the region of the tracking object recognized from the captured image by recognition processing using machine learning represented by pattern matching or Deep Learning may be used as the thumbnail candidate image. The thumbnail candidate image may be selected by a user operation on an operation unit 399. For example, each captured image acquired by the acquisition unit 201 is displayed on a display device 220. The user operates the operation unit 399 to input an acquisition instruction when a captured image including the tracking object is displayed on the display screen of the display device 220. Upon detecting the acquisition instruction, the acquisition unit 600 acquires the captured image displayed on the display screen of the display device 220 at that timing as a thumbnail candidate image.

Next, in step S701, the selection unit 601 selects an image suitable for confirming the tracking object as a thumbnail image from the thumbnail candidate images acquired by the acquisition unit 600.

The thumbnail image selection method is not limited to a specific selection method as long as it is a method of selecting an image in which a tracking object can be recognized. For example, a method of specifying the region of the tracking object and selecting an image in which the region is not in contact with an end of the image (an image in which the tracking object is not partially cut off) may be used. Alternatively, thumbnail candidate images may be displayed as a list on the display screen of the display device 220, and the user may select an image from them by operating the operation unit 399. If the thumbnail image of another tracking object is already registered, an image whose similarity to the image feature of the thumbnail image is low may be selected. A method of acquiring the similarity of an image feature may be feature point matching such as SIFT (Scale Invariant Feature Transform) or ORB (Oriented FAST and Rotated BRIEF) A method using machine learning represented by Deep Learning may be used.

Note that regardless of the selection method used to select the thumbnail image, it is necessary to specify (recognize) which tracking object the thumbnail image belongs to, and the identifier of the corresponding tracking object is associated with the selected thumbnail image.

As described above, according to this embodiment, a thumbnail image is selected from a plurality of thumbnail candidate images. It is therefore possible to display, on the GUI, an image suitable for confirming the tracking object. This makes it easier to link the information of a tracking object with the tracking object and recognize them. Furthermore, if a uniquely decided image is used as the thumbnail image, the correspondence between the index geometric information of the tracking object and the thumbnail image may be inconsistent. However, according to this embodiment, the inconsistency can be prevented by using, as the thumbnail image, the captured image used to identify an index.

Third Embodiment

In the first and second embodiments, an index is added to a tracking object. This aims at measuring the position/orientation of the object. In this embodiment, for the same purpose, a magnetic receiver is attached to a tracking object in place of an index.

Figure 8:
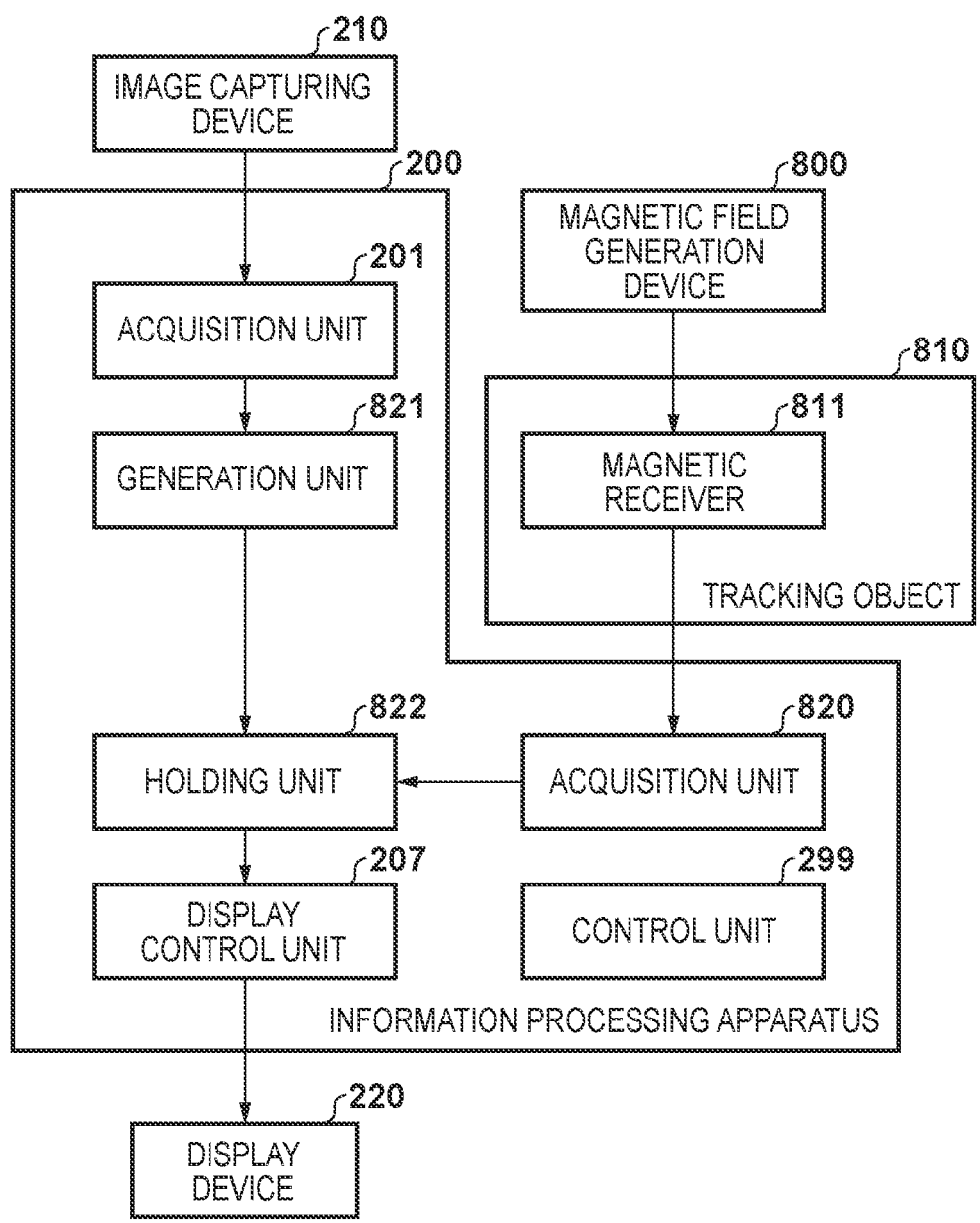
FIG. 8 is a block diagram showing an example of the functional arrangement of a system.

An example of the functional arrangement of a system according to this embodiment will be described with reference to the block diagram of FIG. 8. A magnetic field generation device 800 is a device that generates a magnetic field around itself. A magnetic receiver 811 is attached to a tracking object 810. The magnetic receiver 811 detects a change in the magnetism according to the position/orientation of the magnetic receiver 811 itself in the magnetic field generated by the magnetic field generation device 800, and inputs a signal representing the result of detection to an information processing apparatus 200.

Upon receiving the signal from the magnetic receiver 811, an acquisition unit 820 obtains the position/orientation of the magnetic receiver 811 (the position/orientation of the tracking object) on a world coordinate system based on the signal. The world coordinate system is a coordinate system decided in accordance with the position/orientation of the magnetic field generation device 800, and is, for example, a coordinate system in which the origin is set at the position of the magnetic field generation device 800, and three axes that are orthogonal to each other at the origin are defined as x-, y-, and z-axes. In addition, the acquisition unit 820 acquires "the identifier unique to the magnetic receiver 811", which is included in the signal from the magnetic receiver 811, and registers the identifier and the position/orientation of the magnetic receiver 811 (the position/orientation of the tracking object) in a holding unit 822 in association with each other.

If the tracking object 810 is included in a captured image acquired by an acquisition unit 201, a generation unit 821 sets the captured image to the thumbnail image of the tracking object 810. Additionally, the generation unit 821 recognizes the captured image, thereby specifying the identifier of the tracking object 810 in identifiers set in advance on a tracking object basis. The generation unit 821 registers the thumbnail image of the tracking object 810 and the identifier of the tracking object 810 in the holding unit 822 in association with each other.

In the holding unit 822, the identifier of the magnetic receiver 811 and the position/orientation of the magnetic receiver 811 are registered in association with each other, and the thumbnail image of the tracking object 810 and the identifier of the tracking object 810 are registered in association with each other. Here, in the holding unit 822, the identifier of the tracking object and the identifier of the magnetic receiver attached to the tracking object are registered in association with each other. Hence, in the holding unit 822, the identifier of the magnetic receiver 811, the position/orientation of the magnetic receiver 811, the thumbnail image of the tracking object 810, and the identifier of the tracking object 810 are registered in association with each other as tracking object information.

The tracking object information does not concern only the thumbnail image and the identifier of the magnetic receiver 811, and may include other information, as in the first embodiment. For example, the tracking object information may hold the information of the tracking object. For example, the tracking object information may include a name used to identify the tracking object, information representing whether to perform tracking or not, and the registration date/time of the tracking object and the updating date/time of the information. Furthermore, the tracking object information may include a virtual object to be superimposed on the tracking object.

Figure 9:
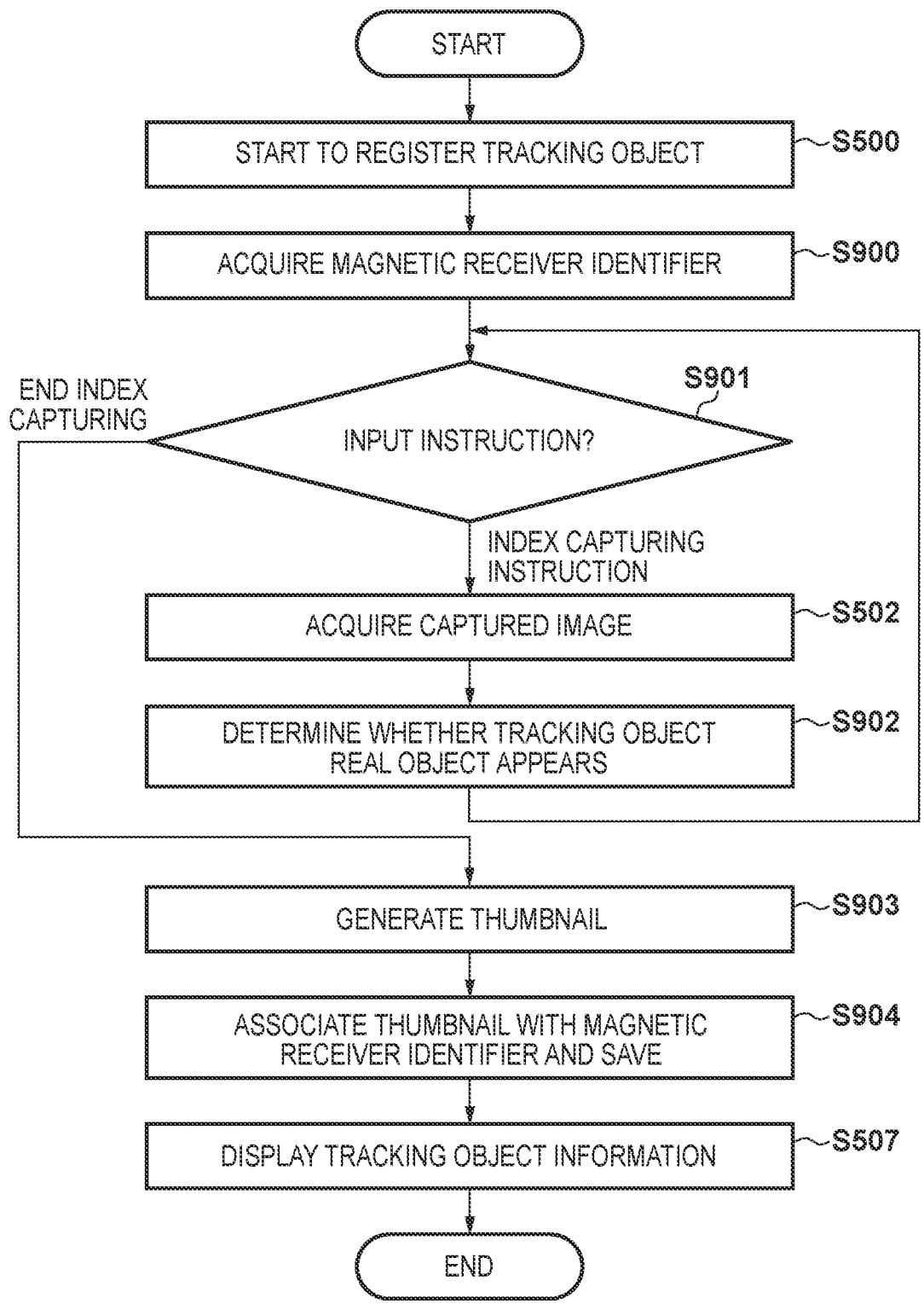
FIG. 9 is a flowchart showing the operation of an information processing apparatus 200.

The operation of the information processing apparatus 200 according to this embodiment will be described with reference to the flowchart of FIG. 9. In step S900, upon receiving a signal from the magnetic receiver 811, the acquisition unit 820 obtains the position/orientation of the magnetic receiver 811 (the position/orientation of the tracking object) on the world coordinate system based on the signal. In addition, the acquisition unit 820 acquires "the identifier unique to the magnetic receiver 811", which is included in the signal from the magnetic receiver 811, and registers the identifier and the position/orientation of the magnetic receiver 811 (the position/orientation of the tracking object) in the holding unit 822 in association with each other.

In step S901, a control unit 299 accepts a start instruction of image capturing by an image capturing device 210. When the user inputs the start instruction of image capturing by operating an operation unit 399, and the control unit 299 detects the start instruction, the process advances to step S502. On the other hand, when the user inputs an end instruction of image capturing by operating the operation unit 399, and the control unit 299 detects the end instruction, the process advances to step S903.

In step S902, the generation unit 821 determines whether the tracking object 810 is included in a captured image acquired by the acquisition unit 201. For example, the image capturing range is estimated from the position/orientation of the image capturing device 210 obtained in step S502 and the viewing frustum of the image capturing device 210. If the tracking object falls within the image capturing range, it can be determined that the tracking object is included in the captured image. The determination method is not limited to this. The determination may be done using an image similarity, or machine learning represented by Deep Learning may be used. The user may visually recognize the captured image and input, by operating the operation unit 399, whether the tracking object is included in the captured image. If the tracking object 810 is included in the captured image acquired by the acquisition unit 201, the process advances to step S903 via step S901.

In step S903, the generation unit 821 sets the captured image to the thumbnail image of the tracking object. In step S904, the generation unit 821 recognizes the captured image, thereby specifying the identifier of the tracking object 810 in the identifiers set in advance on a tracking object basis. The generation unit 821 registers the thumbnail image of the tracking object 810 and the identifier of the tracking object 810 in the holding unit 822 in association with each other. As described above, by this registration, the identifier of the magnetic receiver 811, the position/orientation of the magnetic receiver 811, the thumbnail image of the tracking object 810, and the identifier of the tracking object 810 are registered in the holding unit 822 in association with each other as tracking object information.

As described above, according to this embodiment, even if the position/orientation of a tracking object in the physical space is measured without using a captured image or an index, the same effect as in the first embodiment can be obtained. That is, the user can recognize which one of a plurality of tracking objects existing in the physical space is a tracking object associated with the virtual space.

Note that in this embodiment, a magnetic sensor is used as a sensor configured to measure the position/orientation of a tracking object. However, a sensor that performs the measurement by another measurement method may be used. For example, the position/orientation of a tracking object may be measured using an ultrasonic sensor, or the position/orientation of a tracking object may be measured mechanically. Alternatively, a natural feature such as an edge or a corner with a brightness gradient on a physical image may be detected without using an index, and the position/orientation of a tracking object may be measured based on the detected natural feature.

Fourth Embodiment

In this embodiment, an image obtained by superimposing a virtual object on a tracking object is used as the thumbnail image of the tracking object. An example of the functional arrangement of a system according to this embodiment will be described first with reference to the block diagram of FIG. 10.

In this embodiment, a magnetic receiver 1000 like a magnetic receiver 811 described above is attached to an image capturing device 210. The magnetic receiver 1000 detects a change in the magnetism according to the position/orientation of the magnetic receiver 1000 itself, and inputs a signal representing the result of detection to an information processing apparatus 200.

Upon receiving the signal from the magnetic receiver 1000, a measurement unit 1010 obtains the position/orientation of the magnetic receiver 1000 (the position/orientation of the image capturing device 210) on a world coordinate system based on the signal. Hence, an acquisition unit 201 according to this embodiment acquires a captured image output from the image capturing device 210.

An acquisition unit 1011 acquires "the position/orientation of a tracking object 810" obtained by an acquisition unit 820 and "an identifier unique to the magnetic receiver 811" acquired by the acquisition unit 820.

A holding unit 1012 holds data of a virtual space such as data (shape information and position/orientation information) concerning a virtual object that constitutes the virtual space and data concerning a light source configured to irradiate the virtual space.

A generation unit 1013 acquires, from the holding unit 1012, the data of a virtual object to be displayed on the tracking object 810 in a superimposed manner, and generates the virtual object based on the data. The generation unit 1013 then arranges the generated virtual object in the virtual space based on "the position/orientation of the tracking object 810" acquired by the acquisition unit 1011. When the coordinate system of the virtual space and the world coordinate system are made to match, the virtual object can be superimposed on the tracking object 810 by arranging the generated virtual object based on "the position/orientation of the tracking object 810".

A generation unit 1014 sets "the position/orientation of the image capturing device 210" obtained by the measurement unit 1010 to the position/orientation of a viewpoint, and generates, as a virtual object image, an image of "the virtual object arranged in the virtual space by the generation unit 1013", which is viewed from the viewpoint. The generation unit 1014 then generates a composite image (an image of a mixed reality space (to be referred to as a mixed reality image hereinafter)) by compositing the captured image acquired by the acquisition unit 201 and the virtual object image generated by the generation unit 1014. Note that the technique of generating an image of a virtual object viewed from a viewpoint having a predetermined position/orientation is a known technique, and a detailed description of the technique will be omitted. The composite image may be displayed on a display device 220.

A generation unit 1015 sets both the captured image (the captured image including the tracking object 810) and the composite image (the composite image of the virtual object image and the captured image including the tracking object 810) generated by the generation unit 1014 to the thumbnail image of the tracking object 810. Note that the present invention is not limited to setting both the captured image (the captured image including the tracking object 810) and the composite image (the composite image of the virtual object image and the captured image including the tracking object 810) generated by the generation unit 1014 to the thumbnail image, and only the composite image may be set to the thumbnail image.

The generation unit 1015 registers the thumbnail image and the identifier of the tracking object 810 in a holding unit 206 in association with each other. In the holding unit 206, the identifier of the magnetic receiver 811, the position/orientation of the tracking object 810, the thumbnail image of the tracking object 810, and the identifier of the tracking object 810 are registered in association with each other as tracking object information.

Figure 11:
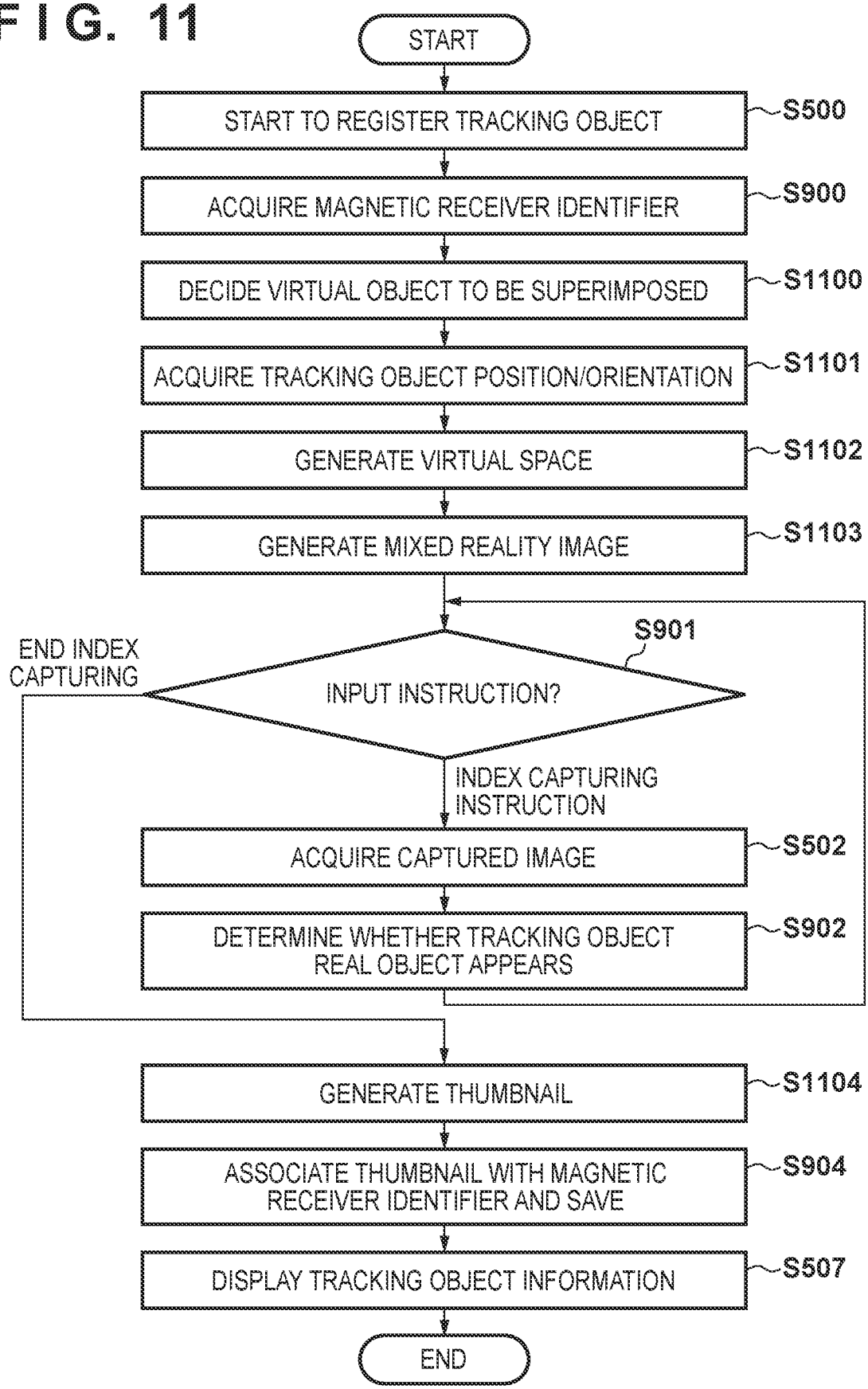
FIG. 11 is a flowchart showing the operation of an information processing apparatus 200.

The operation of the information processing apparatus 200 according to this embodiment will be described with reference to the flowchart of FIG. 11. In step S1100, the generation unit 1013 acquires the data of a virtual object to be displayed on the tracking object 810 in a superimposed manner from the holding unit 1012. The virtual object to be displayed on the tracking object 810 in a superimposed manner may be selected by a user operation on an operation unit 399, or a virtual object having a shape closest to the shape of the tracking object 810 on a captured image may be selected. Alternatively, the data of a virtual object held in advance in the holding unit 1012 in association with "the identifier unique to the magnetic receiver 811" acquired by the acquisition unit 1011 may be acquired.

In step S1101, the acquisition unit 1011 acquires "the position/orientation of the tracking object 810" obtained by the acquisition unit 820 and "the identifier unique to the magnetic receiver 811" acquired by the acquisition unit 820.

In step S1102, the generation unit 1013 generates the virtual object (virtual space) based on the data of the virtual object acquired in step S1100. The generation unit 1013 arranges the generated virtual object in the virtual space based on "the position/orientation of the tracking object 810" acquired by the acquisition unit 1011.

Note that in this embodiment, the virtual object itself to be superimposed on the tracking object is superimposed. However, the present invention is not limited to this. Data representing the local coordinate system of the virtual object may be used if the position/orientation relationship between the tracking object and the virtual object to be superimposed can be recognized. For example, a virtual object expressing three axes (x-, y-, and z-axes) that are orthogonal to each other at the origin of the coordinate system may be used.

In step S1103, the generation unit 1014 sets "the position/orientation of the image capturing device 210" obtained by the measurement unit 1010 to the position/orientation of a viewpoint, and generates, as a virtual object image, an image of "the virtual object arranged in the virtual space by the generation unit 1013", which is viewed from the viewpoint. The generation unit 1014 then generates a composite image (an image of a mixed reality space (to be referred to as a mixed reality image hereinafter)) by compositing the captured image acquired by the acquisition unit 201 and the virtual object image generated by the generation unit 1014.

Note that if the tracking object 810 is included in the captured image acquired by the acquisition unit 201 as the result of determination in step S902, the process advances to step S1104 via step S901.

In step S1104, the generation unit 1015 sets both the captured image (the captured image including the tracking object 810) and the composite image (the composite image of the virtual object image and the captured image including the tracking object 810) generated by the generation unit 1014 to the thumbnail image of the tracking object 810. The generation unit 1015 registers the thumbnail image generated by the generation unit 1015 and the identifier of the tracking object 810 in the holding unit 206 in association with each other.

As described above, according to this embodiment, the mixed reality image is displayed as the thumbnail image in addition to the captured image obtained by wholly or partially capturing the tracking object, thereby making it easy to recognize how the tracking object is used in the virtual space. That is, it is possible to recognize how the virtual object is superimposed on the tracking object.

Note that in this embodiment, the position/orientation is measured using a magnetic sensor. However, the position/orientation may be measured by another method. For example, the position/orientation may be measured using infrared light, the position/orientation may be measured using an ultrasonic wave, or the position/orientation may be measured using image processing. Furthermore, the position/orientation may be measured using a depth sensor, or the position/orientation may be measured mechanically.

Fifth Embodiment

The above-described processes need not always be executed in the above-described order, and the order of some processes may be changed as needed. In addition, the main constituent that performs the above-described processes is not limited to the main constituent in the above description.

The functional units of the information processing apparatus 200 shown in FIGS. 2, 6, 8, and 10 may be implemented by hardware, or some functional units (except the holding unit) may be implemented by a computer program as in the above-described embodiments.

Some or all of the above-described embodiments and modifications may appropriately be combined and used. In addition, some or all of the above-described embodiments and modifications may selectively be used.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-025791, filed on Feb. 15, 2019, which is hereby incorporated by reference herein in its entirety.

What is claimed is:
1. An information processing apparatus comprising:
one or more processors; and
one or more memories coupled to the one or more processors, the one or more memories having stored thereon instructions which, when executed by the one or more processors, cause the apparatus to:
identify each of a plurality of indices included in a captured image, where a plurality of physical objects is included and each of the plurality of physical objects is added with at least two indices;
acquire index information concerning each of the identified indices, the index information concerning an index including an identifier of a physical object added with the index;
identify physical objects each of which is added with at least one of the identified indices based on the acquired index information;
generate a thumbnail image of each of the identified physical objects;

register, in a memory, an identification name and the thumbnail image of each of the identified physical objects; and display a list of the identified physical objects which includes identification names of the identified physical objects in correspondence with respective thumbnail images.

2. The apparatus according to claim 1, wherein the thumbnail image of the physical object is generated based on the captured image.

3. The apparatus according to claim 1, wherein the thumbnail image of the physical object is generated based on another captured image of the physical object captured by an image capturing device different from an image capturing device that has captured the captured image.

4. The apparatus according to claim 1, wherein a plurality of captured images are acquired, and the thumbnail image of the physical object is generated based on one of the plurality of captured images.

5. The apparatus according to claim 1, wherein the instructions, when executed by the one or more processors, further cause the apparatus to process the thumbnail image.

6. The apparatus according to claim 1, wherein the instructions, when executed by the one or more processors, further cause the apparatus to display information representing whether the physical object is a target for measuring a position and an orientation.

7. The apparatus according to claim 1, wherein the list of the identified physical objects is displayed on a head mounted display.

8. A non-transitory computer-readable storage medium storing a computer program configured to cause a computer to:

identify each of a plurality of indices included in a captured image, where a plurality of physical objects is included and each of the plurality of physical objects is added with at least two indices;

acquire index information concerning each of the identified indices, the index information concerning an index including an identified of a physical object added with the index;

identify physical objects each of which is added with at least one of the identified indices based on the acquired index information;

generate a thumbnail image of each of the identified physical objects;

register, in a memory, an identification name and the thumbnail image of each of the physical objects; and display a list of the identified physical objects which includes identification names of the identified physical objects in correspondence with respective thumbnail images.

9. An information processing method comprising:

identifying each of a plurality of indices included in a captured image, where a plurality of physical objects is included and each of the plurality of physical objects is added with at least two indices;

acquiring index information concerning each of the identified indices, the index information concerning an index including an identifier of a physical object added with the index;

identifying physical objects each of which is added with at least one of the identified indices based on the acquired index information;

generating a thumbnail image of each the identified physical objects;

registering, in a memory, an identification name and the thumbnail image of each of the identified physical objects; and displaying a list of the identified physical objects which includes identification names of the identified physical objects in correspondence with respective thumbnail images.

10. The method according to claim 9, wherein in the generating the thumbnail image of the physical object, the thumbnail image of the physical object is generated based on another captured image of the physical object captured by an image capturing device different from an image capturing device that has captured the captured image.

11. The method according to claim 9, wherein in the generating the thumbnail image of the physical object, a plurality of captured images including the captured image are acquired, and the thumbnail image of the physical object is generated based on one of the plurality of captured images.

* * * * *